(12) United States Patent
Ulrich (10) Patent No.: US 8,910,595 B2
(45) Date of Patent: Dec. 16, 2014

(54) FULLY AUTOMATED, SENSOR-DRIVEN, CATCH SYSTEM FOR A HYDRAULIC LIVESTOCK SQUEEZE CHUTE

(76) Inventor: Matthew J. Ulrich, Dodge, NE (US)

( * ) Notice: Subject to any disclaimer, the term of this patent is extended or adjusted under 35 U.S.C. 154(b) by 391 days.

(21) Appl. No.: 13/359,621

(22) Filed: Jan. 27, 2012

(65) Prior Publication Data

US 2013/0192538 A1    Aug. 1, 2013

(51) Int. Cl.
*A01K 15/04*    (2006.01)

(52) U.S. Cl.
USPC ............................................................ 119/732

(58) Field of Classification Search
CPC .................................................... A01K 1/0613
USPC ......... 119/730, 731, 732, 733, 734, 738, 740, 119/741, 742, 751, 843, 525
See application file for complete search history.

(56) References Cited

U.S. PATENT DOCUMENTS

| 3,221,707 | A | | 12/1965 | Pearson | |
|---|---|---|---|---|---|
| 4,100,886 | A | | 7/1978 | Wade et al. | |
| 4,136,640 | A | * | 1/1979 | Gofflot | 119/732 |
| 4,167,155 | A | | 9/1979 | Wade et al. | |
| 4,226,212 | A | | 10/1980 | Priefert | |
| 4,632,063 | A | | 12/1986 | Priefert | |
| 4,702,200 | A | | 10/1987 | Simington | |
| 4,967,083 | A | * | 10/1990 | Kornbrekke et al. | 250/341.7 |
| 5,109,802 | A | | 5/1992 | Priefert | |
| 5,979,365 | A | * | 11/1999 | Sorraghan et al. | 119/524 |
| 6,609,480 | B2 | | 8/2003 | Daniels et al. | |
| 7,770,542 | B2 | * | 8/2010 | Mollhagen | 119/734 |
| 7,918,191 | B2 | | 4/2011 | Gipson | |
| 2004/0007191 | A1 | * | 1/2004 | Greeson | 119/665 |
| 2005/0132978 | A1 | * | 6/2005 | Bentz | 119/732 |
| 2006/0254532 | A1 | | 11/2006 | Boriack et al. | |
| 2009/0318801 | A1 | * | 12/2009 | Haynes | 600/427 |
| 2013/0047930 | A1 | * | 2/2013 | Risser | 119/450 |

* cited by examiner

*Primary Examiner* — David Parsley
*Assistant Examiner* — Thien Thanh Pham
(74) *Attorney, Agent, or Firm* — Dennis L. Thomte; Thomte Patent Law Office LLC

(57) ABSTRACT

A fully automated, sensor-driven, catch system for a hydraulic livestock squeeze chute which includes a plurality of spaced-apart sensors positioned on the chute.

One of the sensors is positioned just outwardly of the tail gate assembly of the chute and another sensor is positioned just inwardly of the tail gate assembly of the chute. A plurality of middle sensors are positioned between the tail gate and head gate assemblies of the chute. One of the sensors is positioned just inwardly of the head gate assembly and another sensor is positioned just outwardly of the head gate assembly.

The sensors send signals to a control module which controls the hydraulic cylinders of the tail gate assembly, the side squeeze panels and the head gate assembly. The sensors sense the movement of the animal as it passes through the chute.

1 Claim, 7 Drawing Sheets

FULLY AUTOMATED, SENSOR-DRIVEN, CATCH SYSTEM FOR A HYDRAULIC LIVESTOCK SQUEEZE CHUTE

BACKGROUND OF THE INVENTION

1. Field of the Invention

This invention relates to a hydraulic livestock squeeze chute and more particularly to a fully automated, sensor-driven catch system for a hydraulic livestock squeeze chute.

2. Description of the Related Art

In the practice of livestock husbandry, it is necessary to restrain livestock such as cattle and bison by way of a squeeze chute having a tail gate, a head gate, and opposite side squeeze panels. The squeeze chute is commonly used for treating or performing typical procedures on livestock such as weighing, vaccinations, identification references, doctoring, and sorting. The head gate portion of the hydraulic squeeze chute is used to catch the animal's head and to restrain the animal. The side squeeze chute apparatus of the squeeze chute restrains the animal's body to keep the animal still and safe with the tail gate of the squeeze chute keeping secondary animals from coming into the chute while it is occupied. The conventional aspects of a squeeze chute are to keep the animals still and safe to administer the typical procedures.

All hydraulic squeeze chutes; of which Applicant is aware, in the industry today require that the operator manually operate the levers of a valve body on the hydraulic squeeze chute to catch the animal and restrain it to hold it still while treating or processing the animal. With a person performing the function, there can be missed catches due to lack of concentration or distraction. This can lead to catching the animal in the wrong place, potentially hurting the animal, as well as causing excess wasted time.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A fully automated, sensor-driven, catch system is provided for a hydraulic livestock squeeze chute, one type of which is depicted in FIGS. 1-5 wherein the squeeze chute has a tail end and a head end. The instant invention may be used on other types of hydraulic squeeze chutes as well. The squeeze chute illustrated in the drawings comprises a lower frame having a tail end, a head end, a first side and a second side. The illustrated squeeze chute also includes an upper frame which is positioned above the lower frame and which has a tail end, a head end, a first side and a second side. A tail gate assembly is provided on the squeeze chute at the tail ends of the lower and upper frames for selectively closing the tail end of the chute. The tail gate assembly includes first and second tail gate members which are movable between open and closed positions. The squeeze chute also includes a head gate assembly which is provided at the head ends of the lower and upper frames for selectively closing the head end of the chute with the head gate assembly including a head catch portion thereon.

A pair of hydraulic cylinders are secured to the tail gate assembly for opening and closing the tail gate members of the tail gate assembly. A pair of hydraulic cylinders are secured to the head gate assembly for pivotally moving the head gate members between open and closed positions. Normally, the squeeze chute will include a pair of side squeeze panels which are movably mounted on the frame means of the chute and which are usually controlled by one or two hydraulic cylinders.

The present invention includes approximately seven sensors mounted on the squeeze chute, a control module with a software program in communication with the sensors and a valve which is in fluid communication with the two head gate hydraulic cylinders, the two tail gate hydraulic cylinders and the squeeze hydraulic cylinder. The operation of the valve is controlled by the control module so that the animal will be caught with as little as possible impact to the head gate by slowing the animal down as it goes through the hydraulic squeeze chute. A first sensor is mounted on the upper frame of the chute just outwardly of the tail gate assembly and a second sensor is mounted on the upper frame of the chute just inwardly of the tail gate assembly. Spaced-apart third, fourth and fifth sensors are mounted on the upper frame of the chute inwardly of the second sensor. A sixth sensor is mounted on the upper frame of the chute just inwardly of the head gate assembly. A seventh sensor is mounted on the upper frame of the chute just outwardly of the head gate assembly. The third, fourth and fifth sensors calculate the speed of the animal moving through the squeeze chute and which will cause the side squeeze panels to either open or shut resulting in slowing down or speeding up the animal. The side squeeze panels move in small increments to maintain the proper speed of the animal. The sensors are positioned on the squeeze chute to read when the animal enters the chute, how quickly it is moving through the chute and when it is in the proper position to be caught by the neck and body so as to be treated or processed. The system will have a release button that will be manually pushed by the operator to release the animal when the processing of that animal is complete. After the release button is pressed, the system takes over to clear the animal and allows the next animal to be caught in the same manner.

The present invention leads to more efficient processing of the animal by having the computer causing the animal to be caught instead of a person manually operating the catch system. The present invention catches the animals with more accuracy and increased efficiency than a person.

It is therefore a principal object of the invention to provide a fully-automated, sensor-driven, catch system for a hydraulic livestock squeeze chute.

A further object of the invention is to provide a system of the type described which leads to more efficient processing of an animal by having a computer causing the animal to be caught.

A further object of the invention is to provide a system of the type described which will catch the animals with more accuracy and increased efficiency than if a catch system is being operated by a person.

A further object of the invention is to provide a system of the type described which employs sensors positioned on the squeeze chute to read when the animal enters the chute, how quickly it is moving through the chute, and when it is in the proper position to be caught by the neck and body so as to be treated or processed.

A further object of the invention is to provide a system of the type described which eliminates miss catches due to lack of concentration or distraction by the person normally operating the system.

A further object of the invention is to provide a system of the type described which may be utilized with a hydraulic squeeze chute of almost any design.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

FIGS. 1-5 illustrate the livestock squeeze chute which is disclosed in Applicant's pending application, Ser. No. 13/199,770 filed Sep. 8, 2011 entitled HEAD GATE FOR A LIVESTOCK SQUEEZE CHUTE, the disclosure of which is incorporated herewith to complete this disclosure.

In FIGS. 1-5, the numeral 10 refers to the livestock squeeze chute which has a tail end 12, a head end 14, a first side 16 and a second side 18. Squeeze chute 10 includes a lower frame means 20 which extends between the tail end 12 and the head end 14 of the squeeze chute 10. Squeeze chute 10 also includes an upper frame means 22 which extends between the tail end 12 and the head end 14 of the squeeze chute 10. The lower frame means 20 and the upper frame means 22 are interconnected by various frame members generally collectively referred to by the reference numeral 24. The squeeze chute 10 includes spaced-apart side squeeze panels 26 and 28 which are laterally movable in conventional fashion to aid in restraining the animal being handled. The upper ends of the panels 26 and 28 are moved inwardly and outwardly by a hydraulic cylinder 29 connected thereto in conventional fashion. In some cases, the lower ends of the panels 26 and 28 are also moved inwardly and outwardly by a hydraulic cylinder.

The numeral 30 refers generally to a conventional tail gate assembly consisting of two movable tail gates 32 and 34 which are selectively movable between open and closed positions in a transverse manner with respect to the longitudinal axis of the squeeze chute 10. The tail gates 32 and 34 are pivotally movable by hydraulic cylinders 32A and 34A attached thereto respectively in conventional fashion.

The numeral 36 refers to a horizontally disposed lower head gate support including a first support member 38 and a second support member 40 which are joined together at their inner forward ends to define a V-shape. As seen, support member 38 extends inwardly and forwardly from side 16 at approximately 30 degrees to the longitudinal axis of the chute 10 at the head end 14 of squeeze chute 10. Support member 38 has a rearward end 42 which is positioned outwardly of the squeeze chute 10. As seen, support member 40 extends forwardly and inwardly from side 18 of squeeze chute 10 at approximately a 30-degree angle with respect to the longitudinal axis of the chute 10. Support member 40 has a rearward end 44 which is positioned outwardly of the squeeze chute 10.

The numeral 46 refers to a first head gate member while the numeral 48 refers to a second head gate member. Head gate member 46 includes an upper end 50, a lower end 52, an outer side 54 and an inner side 56. Inner side 56 of head gate member 46 has an outwardly extending angular or arcuate portion 58 to provide a space for the animal's neck. The lower end 52 of head gate member 40 is pivotally secured to support member 38 at 60. The upper inner end of head gate member 46 has an upwardly extending protrusion or contact point 62, the purpose of which will be described hereinafter. The lower end of a hydraulic cylinder 64 is pivotally connected to the rearward end 42 of support member 38 at 66. The rod end of hydraulic cylinder 64 is pivotally secured to head gate member 46 at 68.

Head gate member 48 includes an upper end 70, a lower end 72, an outer side 74 and an inner side 76. Inner side 76 of head gate member 48 has an outwardly extending angular or arcuate portion 78 to provide a space for the animal's neck. The lower end 72 of head gate member 48 is pivotally secured to support member 40 at 80. The upper inner end of head gate member 48 has an upwardly extending protrusion or contact point 82, the purpose of which will be described hereinafter. The lower end of a hydraulic cylinder 84 is pivotally connected to the rearward end 44 of support member 40 at 86. The rod end of hydraulic cylinder 84 is pivotally secured to head gate member 48 at 88.

The numeral 90 refers to a horizontally disposed upper head gate support including a first support member 92 and a second support member 94 which are joined together to define a V-shape which is the same as the V-shaped support 36. As seen, support member 92 extends inwardly and forwardly from side 16 at the head end 14 of squeeze chute 10. Support member 92 has a rearward end 96 which is positioned outwardly of the squeeze chute 10. As also seen, support member 94 extends forwardly and inwardly from side 18 of the squeeze chute 10. Support member 94 has a rearward end 98 which is positioned outwardly of the squeeze chute 10.

Support member 92 has an elongated slot 100 formed therein and support member 94 has an elongated slot 102 formed therein. The forward ends of the slots 100 and 102 communicate with each other. Protrusion 62 of head gate member 46 extends upwardly through slot 100 in support member 92 with protrusion 82 of head gate member 48 extending upwardly through slot 102 in support member 94. The head gate members 46 and 48 and their supporting structure will be described as a head gate assembly 103.

Figure 1:
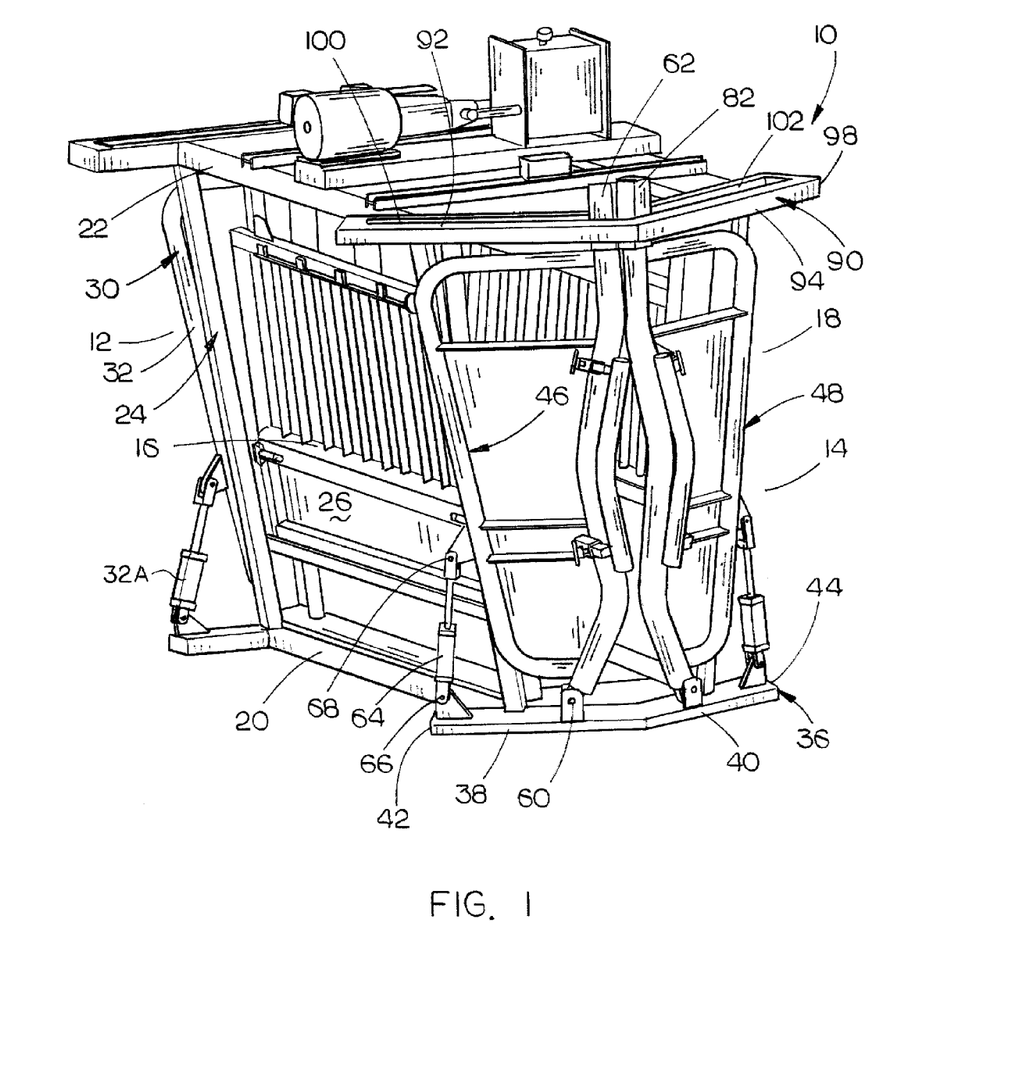
FIG. 1 is an upper perspective front view of a squeeze chute to which the system of this invention may be associated.
Figure 2:
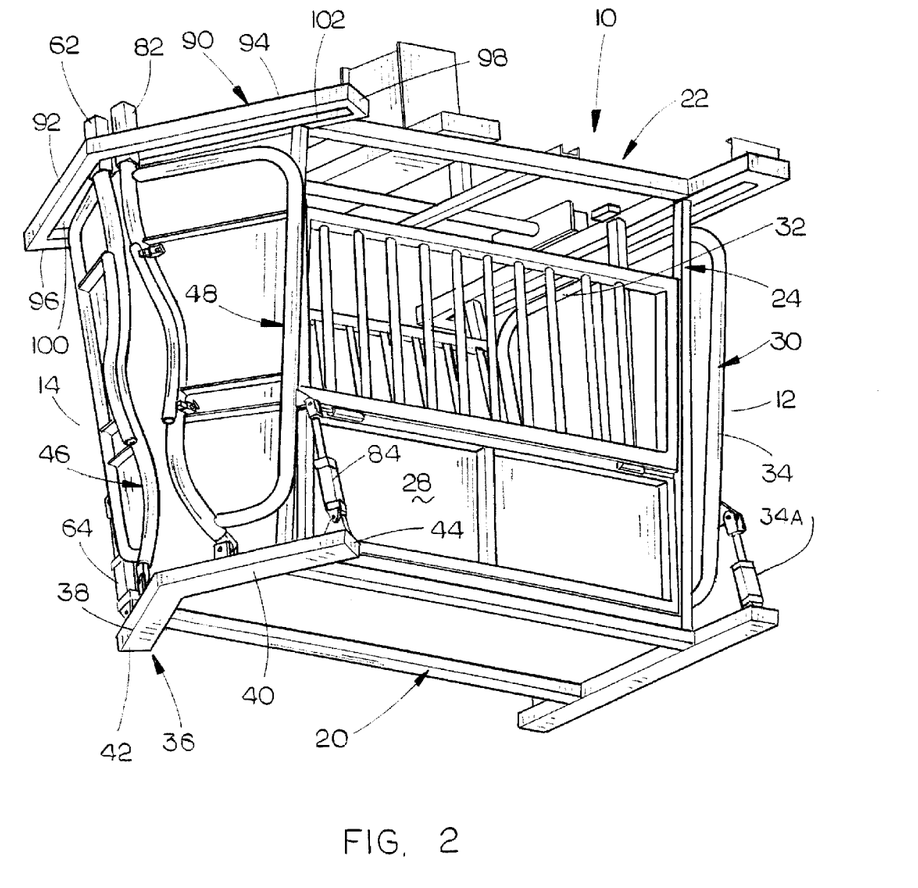
FIG. 2 is a lower front perspective view of the squeeze chute of FIG. 1.
Figure 3:
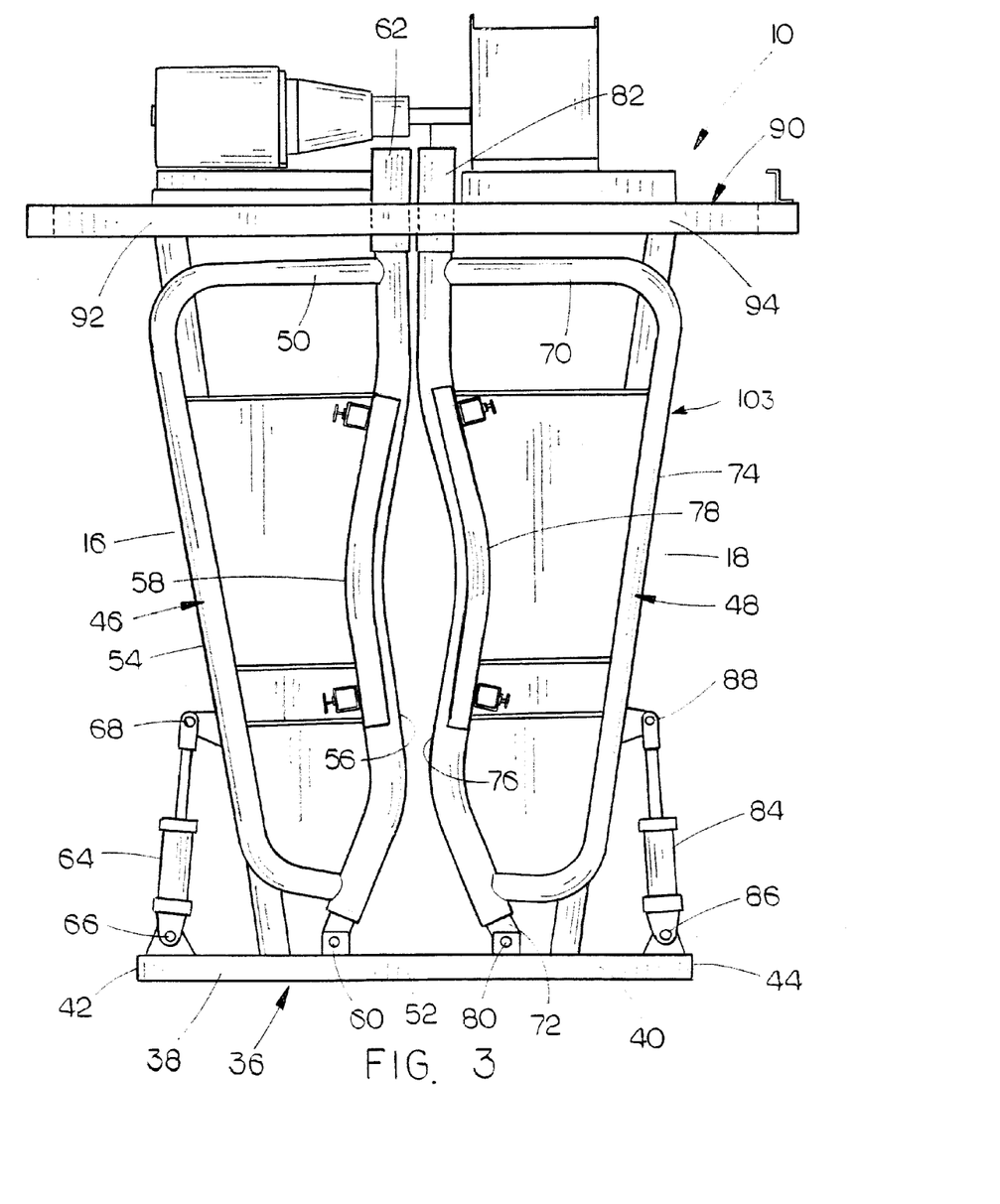
FIG. 3 is a front view of the squeeze chute of FIG. 1.
Figure 4:
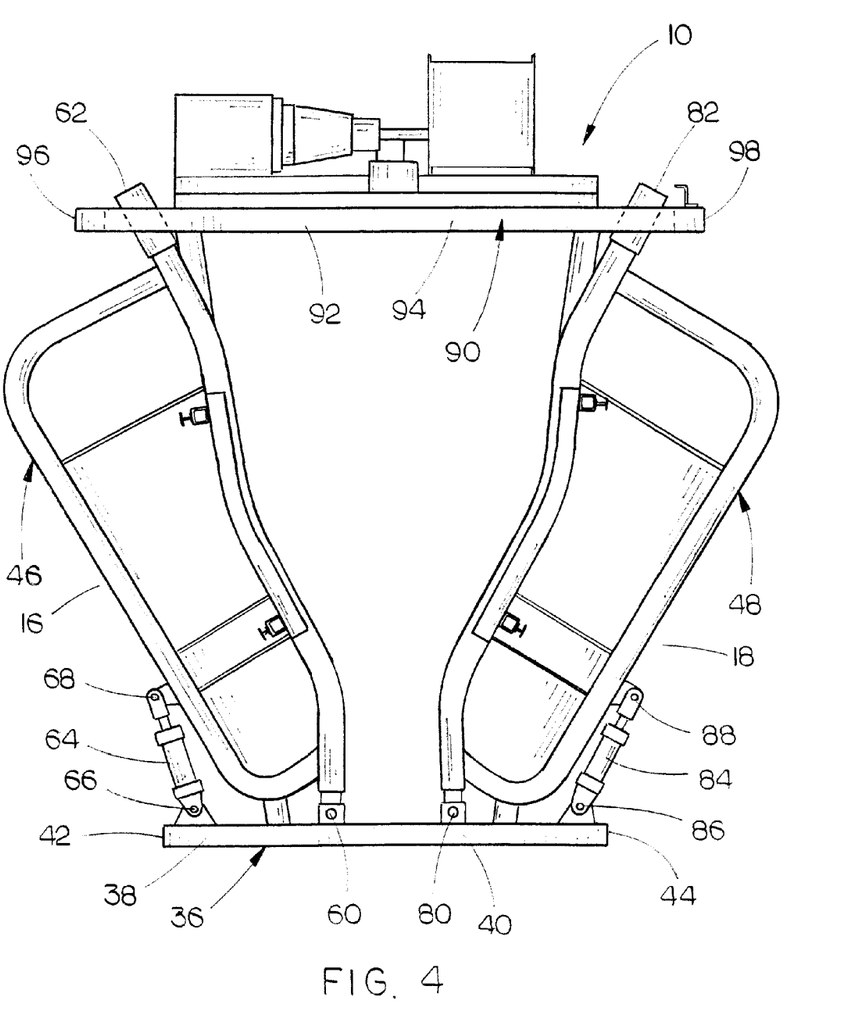
FIG. 4 is a front view of the squeeze chute of FIG. 1 which illustrates the head gate members of the squeeze chute in an open position.
Figure 5:
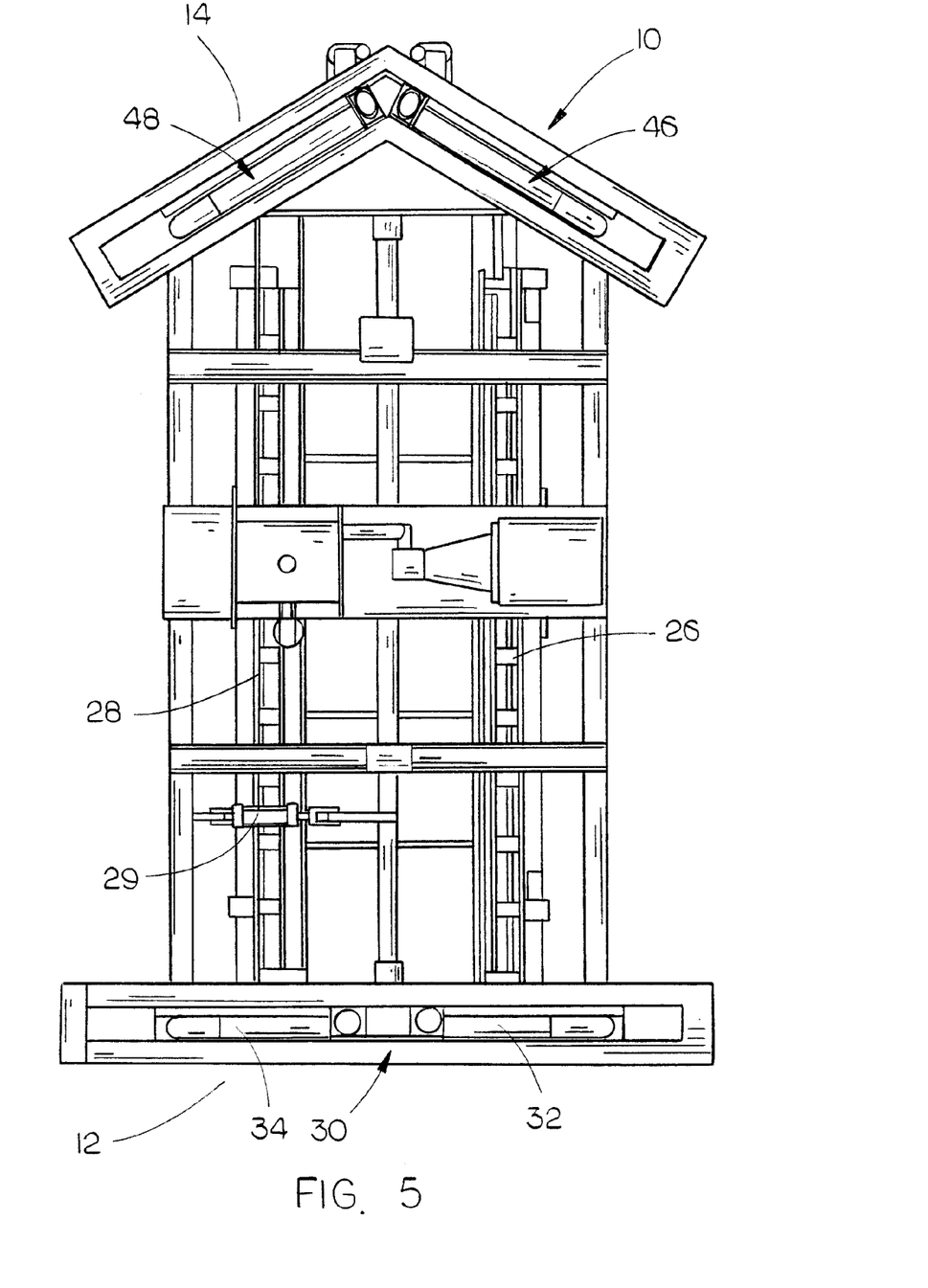
FIG. 5 is a top view of the squeeze chute of FIG. 1.
Figure 6:
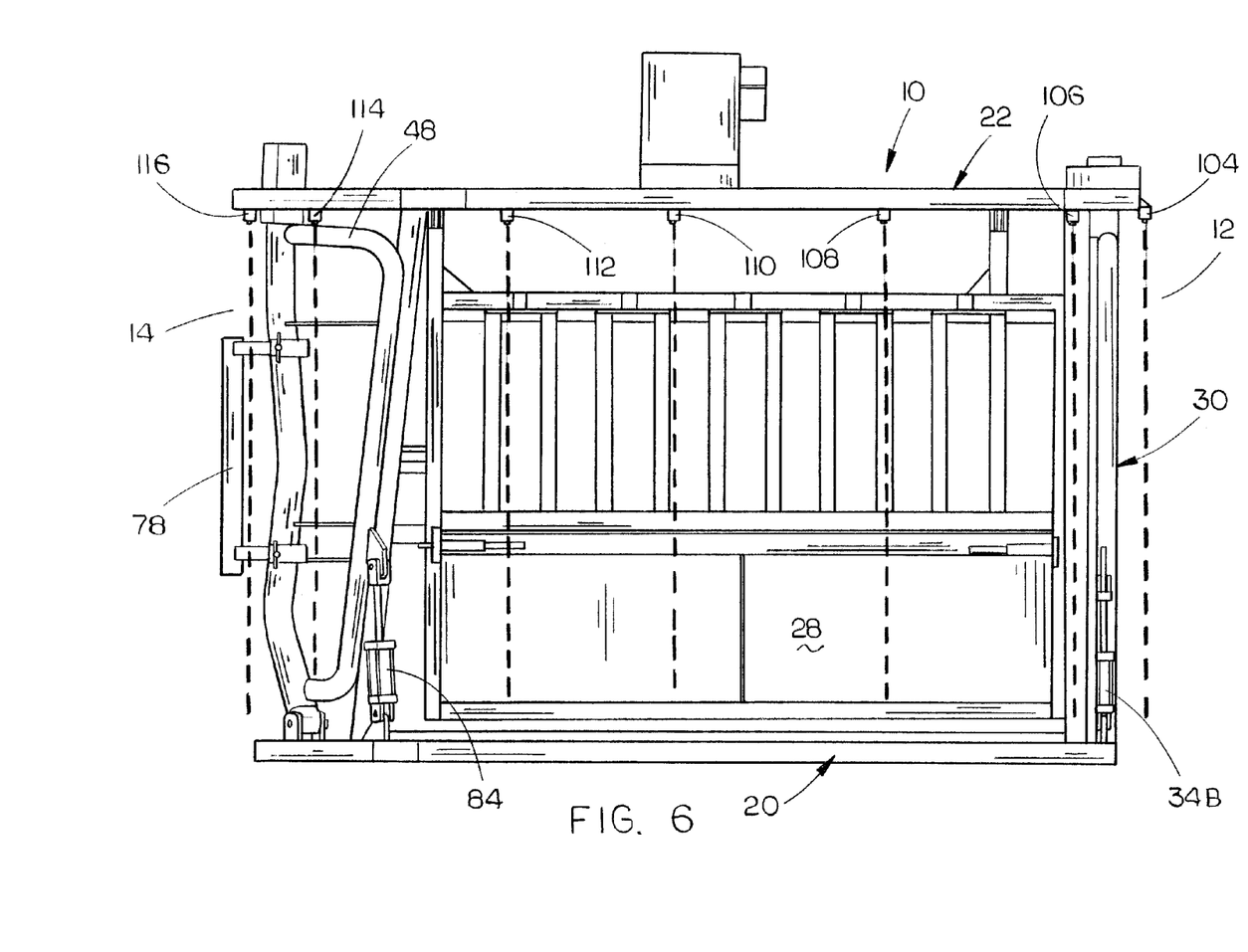
FIG. 6 is a side view of the squeeze chute having the sensors thereon.

The numerals 104, 106, 108, 110, 112, 114 and 116 refer to sensors which are mounted on the upper frame means 22. Preferably, the sensors are ultrasonic sensors of conventional off-the-shelf design. Sensor 104 is positioned just outwardly of the tail gate assembly 30 as seen in FIG. 6. Sensor 106 is positioned just inwardly of the tail gate assembly 30 as also seen in FIG. 6. Sensors 108, 110 and 112 are positioned in the middle of the chute 10 in a horizontally spaced-apart manner (FIG. 6). Sensor 114 is positioned just inwardly of head gate assembly 103 and sensor 116 is positioned just outwardly of head gate assembly 103 as seen in FIG. 6.

Figure 7:
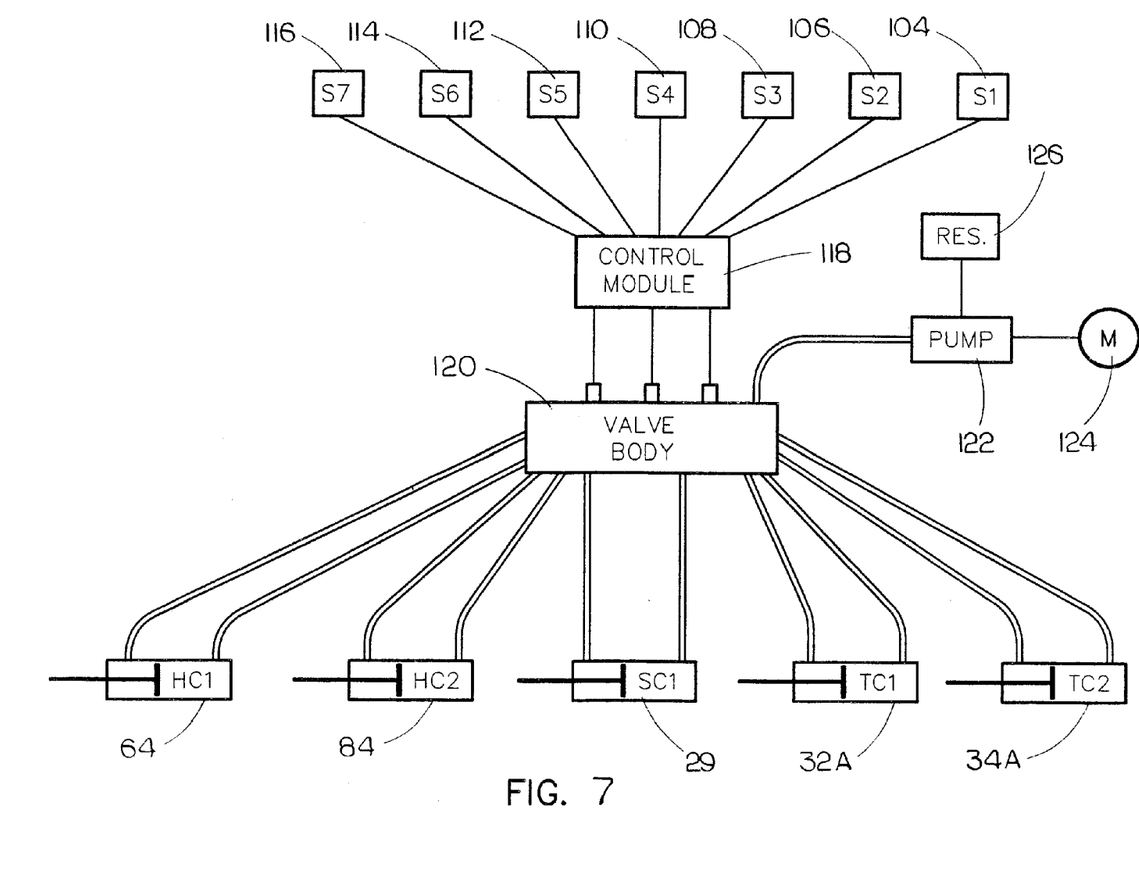
FIG. 7 is a schematic view of the control and hydraulic circuitry of this invention.

The sensors 104, 106, 108, 110, 112, 114 and 116 are in communication with a control module 118 by wires, as seen in FIG. 7, so as to receive signals from the sensors. Control module 118 is electrically connected to a 3-spool valve body 120 which controls the operation of the tail gate hydraulic cylinders 32A and 34A, the squeeze panel hydraulic cylinder 29 and the head gate hydraulic cylinders 64 and 84.

Valve body 120 is in fluid communication with a hydraulic pump 122 which is driven by a motor or engine 124. Pump 122 is in fluid communication with a hydraulic fluid reservoir 126 in conventional fashion. As seen, the hydraulic cylinders 32A, 34A, 29, 64 and 84 are of the double-acting type.

In the design of this application, Applicant has provided a system including a control module which receives signals from approximately seven sensors. As described above, the sensors are located on the underside of the top frame of the hydraulic squeeze chute. The tail gates and the head gates are preferably in their open position as the process begins. The first sensor 104 reads or senses that an animal is coming into the chute. The second sensor 106 is located just inside the tail gate assembly as previously described. As the animal passes the sensor 106, sensor 106 will send a signal to the control module 118 that the animal has cleared the tail gate assembly. The first sensor 104 will read that another animal is not trying to enter the hydraulic squeeze chute. When the first animal has cleared the tail gate assembly and another is not entering, the tail gate assembly will close. If another animal is entering the tail gate assembly, the computer will go through a series of moves to get the second animal to back out. This procedure entails closing the tail gate assembly three quarters of the way to not allow the second animal to get its body into the hydraulic squeeze chute while allowing the animal to still pull its head out of the tail gate assembly. When the animal has passed the second sensor 106 and the first sensor 104, the tail gate assembly will close completely. In the main body squeeze portion of the chute, the sensors 108, 110 and 112 will communicate to the control module 118 how fast the animal is moving through the chute. If the animal is moving too fast through the chute, the computer in the control module 118 will send a signal to the valve body 120 to start closing the side squeeze panels. The side squeeze panels will close from being completely open to a slowly closed position. This slows the animal down and eventually will catch the animal's body before catching the neck. Sensor 116 advises the control module 118 that the animal's head is in the proper position to be completely caught. The side squeeze panels will finish the complete squeeze as the head gates close, catching the neck. If the animal puts its head through the head gate assembly but backs up immediately, sensor 114 will read such and will open the head gate up slightly and will release the side squeeze panels slightly for the animal to reposition its head to the catch position. Sensor 116 then reads when the animal is in position and catches the animal by closing the head gates.

When the operator is finished working and/or treating the animal, the operator will push a button on the control module screen or on a remote to fully release the animal. The animal is released by opening the head gate assembly. As the animal is leaving the chute, the tail gate assembly 30 opens up allowing the next animal to come into the hydraulic squeeze chute. The system goes back to the above-stated sequence to catch the next animal.

The system may have several key adjustments that can be made to the system by the operator. The catch position of the head gate assembly may be set to a specific position of 12 inches. This allows the head to just fit through the head gate assembly. If the operator sees that it is necessary to increase or decrease this distance, the operator may push a plus or minus button on the control module 118 to get the front head gate to open or close. This adjustment may be in increments of one-quarter inch. The system will also be able to be adjusted to not close the tail gate assembly for some operators wish to keep this open during processing. All settings will be saved so as to operate in the same manner every time.

The system of this invention will not over squeeze the animal because of the pressure controls that are set on the valve body. As the system catches the animal, the system will stop the squeeze as it reaches the set top end pressure. This will then put the valve back in the center position, stopping any further squeeze.

An eighth sensor may be placed on the neck catch area of the head gate assembly. This eighth sensor will sense if the animal's head is either in the down position, middle position or up position. The animal's head needs to be in the middle position to be properly caught. If the head is either in the top or bottom position, the sensor will send a signal to the system to not close the head gate.

In summary, all of the sensors of this invention will take readings of the animal's movement which will in turn send signals to the computer of the control module 118 which will take the readings and decipher the readings to go through the stated events to catch the animal with no operator help. The computer will send signals to the valve body 120 to actuate the hydraulic cylinders on the chute to perform the stated catch maneuvers.

The control module 118 will consist of a touch-screen tabloid style system which may be placed on the chute or placed on a table near the chute. The remote will consist of an arming button which reads the chute to catch the animals at the start of the processing of a group of animals. This will only be needed to be pushed once on either the remote or screen to start the process. The remote and screen will then have a release button which will need to be pushed every time the operator is done with the current animal and is ready for the next one to be processed.

Thus it can be seen that a novel, fully automated, sensor-driven catch assembly is provided for a hydraulic livestock squeeze chute which accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A livestock catch system, comprising:
    a livestock squeeze chute having a tail end, a head end, a first side and a second side;
    said livestock squeeze chute including a hydraulically operated tail gate assembly, having first and second tail gate members at said tail end thereof which are movable between open and closed positions;
    said livestock squeeze chute including a hydraulically operated head gate assembly having first and second head gate members at said head end thereof which are movable between open and closed positions;
    said head gate assembly including a catch portion for capturing the neck and head of an animal being processed;
    said livestock squeeze chute including hydraulically operated side squeeze panels which are movable towards the animal or away from the animal;

a first hydraulic cylinder operatively connected to said first tail gate member for moving said first tail gate member between open and closed positions;

a second hydraulic cylinder operatively connected to said second tail gate member for moving said second tail gate member between open and closed positions;

a third hydraulic cylinder operatively connected to said side squeeze panels for moving said side squeeze panels towards the animal or away from the animal;

a fourth hydraulic cylinder operatively connected to said first head gate member for moving said first head gate member between open and closed positions;

a fifth hydraulic cylinder operatively connected to said second head gate member for moving said second head gate member between open and closed positions;

a plurality of sensors mounted on said livestock squeeze chute;

one of said plurality of sensors being positioned on said livestock squeeze chute outwardly of said tail end thereof which senses when an animal is entering said livestock squeeze chute through said tail gate assembly;

one of said plurality of sensors being positioned inwardly of said tail end of said livestock squeeze chute which senses when the animal has cleared said tail gate assembly;

some of the other sensors which are mounted on said livestock squeeze chute being mounted between said tail gate assembly and said head gate assembly which sense the speed of the animal's movement through said livestock squeeze chute;

one of said plurality of sensors being positioned on said livestock squeeze chute inwardly of said head gate assembly;

one of said plurality of sensors being positioned on said livestock squeeze chute outwardly of said head gate assembly;

a control module including a software program;

said plurality of sensors being electronically connected to said control module;

a valve body in fluid communication with said hydraulic cylinders which operates said first, second, third, fourth and fifth hydraulic cylinders;

said control module being operatively connected to said valve body and said plurality of sensors to operate said valve body in response to signals sent to said control module by said plurality of sensors;

at least one of said plurality of sensors sensing when an animal has entered said livestock squeeze chute so that said control module will operate said valve body to close said tail gate assembly;

and at least one of said plurality of sensors sensing when the animal has its head properly positioned in said catch portion of said head gate assembly so that said control module will operate said valve means to close said head gate assembly;

said control module causing said valve body to operate said third hydraulic cylinder to move said side squeeze panels towards the animal when the associated sensors indicate that the animal's speed rate through the livestock squeeze chute is too fast;

said control module causing said valve body to operate said third hydraulic cylinder to move said side squeeze panels away from the animal when the associated sensors indicate that the animal's speed rate through the livestock squeeze chute is too slow.

* * * * *